Patented Oct. 6, 1925.

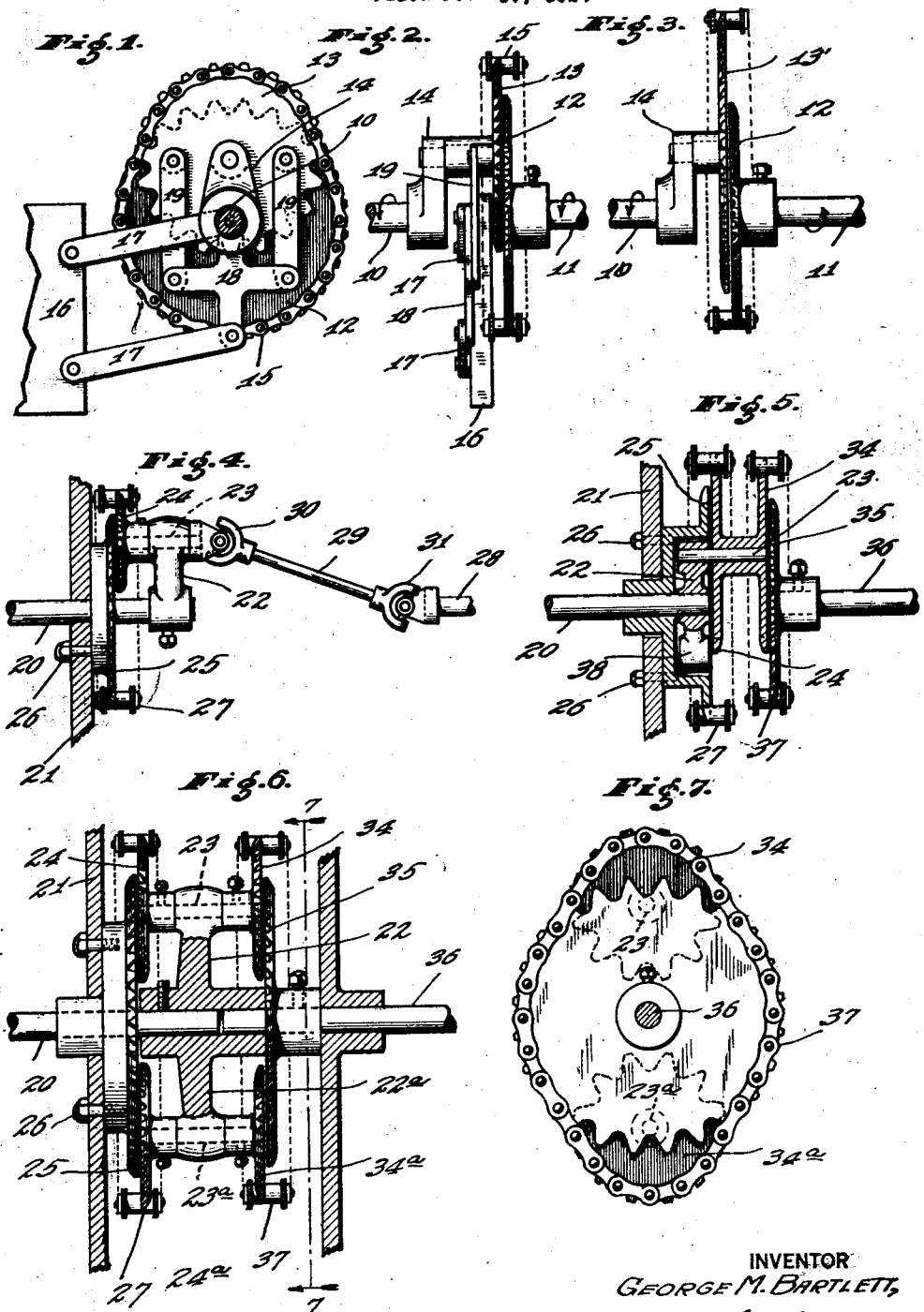

1,556,399

UNITED STATES PATENT OFFICE.

GEORGE M. BARTLETT, OF INDIANAPOLIS, INDIANA, ASSIGNOR TO DIAMOND CHAIN AND MANUFACTURING COMPANY, OF INDIANAPOLIS, INDIANA, A CORPORATION OF INDIANA.

SPEED-CHANGE MECHANISM.

Application filed December 10, 1924. Serial No. 754,928.

*To all whom it may concern:*

Be it known that I, GEORGE M. BARTLETT, a citizen of the United States, residing at Indianapolis, in the county of Marion and State of Indiana, have invented a new and useful Speed-Change Mechanism, of which the following is a specification.

It is the object of my present invention to produce a speed-changing planetary chain-drive of great speed-changing capacity and of small size.

In carrying out my invention, I provide one or more sets of sprockets, with the sprockets of each set including a sun sprocket and a planet sprocket which overlaps the sun sprocket and is connected thereto by an endless chain, together with supporting means for permitting the axis of the planet sprocket to rotate around the axis of the sun sprocket, and means whereby at least one sprocket of one set of sprockets is constrained as to rotation about its own axis.

My invention may take a number of forms, of which the accompanying drawings illustrate only a few: Fig. 1 is an end elevation of a planetary chain-drive embodying my invention, and having but a single set of overlapping sprockets, with the planet sprocket of smaller diameter than the sun sprocket, and with the planet sprocket constrained against rotation about its own axis; Fig. 2 is a side elevation of the planetary chain-drive shown in Fig. 1; Fig. 3 is a view similar to Fig. 2, but with the planet sprocket of larger diameter than the sun sprocket, and, for simplicity of showing, with the means omitted for holding the planet sprocket against rotation about its own axis; Fig. 4 is a view, in general similar to Fig. 2, of a modification, but with the sun sprocket held against rotation about its axis; Fig. 5 is a sectional view, viewed from the same general position as Fig. 2 is taken, with two sets of overlapping sprockets associated in a double planetary arrangement, with the whole shown rather diagrammatically; Fig. 6 is a view in general similar to Fig. 5, showing substantially the same arrangement involving two sets of overlapping sprockets, but with each set of sprockets involving a pair of planetary sprockets, and with the whole shown rather less diagrammatically than in Fig. 5; and Fig. 7 is a section on the line 7—7 of Fig. 6.

In every instance illustrated, there are one or more sets of sprockets in which one or more planet sprockets overlap an associated sun sprocket, with all the sprockets of a set connected by an endless chain. To permit the chain to engage the teeth of all the sprockets of a set, such chain is sufficiently wide so that it overlaps the planes of all those sprockets.

Referring first to the arrangement shown in Figs. 1 and 2.

There are two shafts 10 and 11, which are substantially coaxial. A sun sprocket 12 is fixed on the shaft 11. A planet sprocket 13 is carried eccentrically by the shaft 10, as by being mounted on a crank or eccentric pin 14 fixed on said shaft 10. Thus by the rotation of the crank 10, the axis of the planet sprocket 13 is revolved around the common axis of the shafts 10 and 11 and sun sprocket 12.

The planet sprocket 13 overlaps the sun sprocket 12, to do which they lie in substantially parallel planes but not in the same plane. This overlapping may be to any extent desired. It may even be sufficient so that either sprocket overlaps the axis of the other, as is here illustrated. The two sprockets 12 and 13 are connected by an endless chain 15. This endless chain is shown as a roller chain, but that is merely by way of illustration, for the type of chain used is not essential to my invention. This chain is of sufficient width so that it overlaps the planes of both sprockets 12 and 13. In other words, the chain is in contact with each sprocket 12 and 13 only for part of the width of the chain; and the chain is of a width slightly greater than the sum of the thicknesses of the sprockets 12 and 13. It is by having the thickness of each sprocket relatively small as compared to the width of the chain that it becomes possible to have the sprockets overlap as shown, and to have the axes of such sprockets much closer together than the sum of the radii of the sprockets.

The planet sprocket 13 is prevented from rotating about its axis, although the axis of such sprocket and the sprocket as a whole may be revolved about the common axis of the shafts 10 and 11 and the sun sprocket 12. As such planet-sprocket axis is thus revolved, but held against rotation, the interaction of the chain 15 with the two sprockets 12 and 13 produces a creeping of the chain 15 around at least one of the sprockets, for the number of links of the chain is necessarily at least as large as the number of teeth on the larger sprocket; and this creeping of the chain under these conditions produces a rotation of the sun sprocket 12 about its axis. If the sun sprocket is larger than the planet sprocket, as is shown in Figs. 1 and 2, the direction of rotation of the sun sprocket is the same as that of the shaft 10, but at a much smaller angular velocity; whereas if the planet sprocket is larger than the sun sprocket, as the planet sprocket 13' is in Fig. 3, the direction of rotation of the sun sprocket is opposite to that of the shaft 10, and also at a much smaller angular velocity.

For example, if the sun sprocket 12 has 20 teeth, and the planet sprocket either one more or one less than twenty, there will be a speed-reduction between the shafts 10 and 11 of twenty to one; in other words, for each twenty revolutions of the shaft 10 there will be one complete revolution of the shaft 11, in the same direction in Fig. 2 but in the opposite direction in Fig. 3.

Various means may be provided for holding the planet sprocket 13 from rotation about its axis while permitting such axis to rotate about the axis of the shaft 10. I have shown one such arrangement in Figs. 1 and 2. Here I show a double parallel-link connection between the planet sprocket 13 and the frame 16 of the machine. That is, two parallel links 17 extend from the frame 16 to opposite ends of one cross-arm of a cross-piece 18, from the opposite ends of whose other cross-arm, perpendicular to the first, two parallel links 19 extend to points on the planet sprocket 13. Each link has pivotal connections at both ends to its associated parts. With this arrangement, any line on the planet sprocket 13 is always maintained parallel to itself as the axis of such sprocket is rotated about the axis of the shaft 10, and thus such planet sprocket is held from rotation about its own axis.

This double parallel-link arrangement for accomplishing this result is merely one example of how this result can be obtained, and my invention is not in any way limited to such parallel link arrangement.

Instead of holding the planet sprocket against rotation about its own axis, the sun sprocket may be so held from rotation about its own axis. I have illustrated such an arrangement in Fig. 4. Here there is a shaft 20, which is mounted in the frame 21 and is provided with a crank-arm 22 in which a counter-shaft 23 is eccentrically located. The counter-shaft 23 carries a planet sprocket 24, which overlaps a sun sprocket 25 parallel to it, in the same way that the sprockets 12 and 13 overlap in Figs. 1 and 2. The sun sprocket 25 is coaxial with the shaft 20, and is fixed to the frame 21, as by one or more pins 26. The two overlapping sprockets 24 and 25 are connected by an endless chain 27 in the same way that the sprockets 12 and 13 are connected by an endless chain 15 in Figs. 1 and 2. The counter-shaft 23 has a suitable driving connection to a shaft 28, desirably coaxial with the shaft 20 though not necessarily so. While this connection may be provided in various ways, it is here shown as provided by an oblique shaft 29 connected at its ends to the respective shafts 23 and 28 by universal joints 30 and 31.

In the operation of the device shown in Fig. 4, rotation of the shaft 20 causes the planet sprocket 24 to move planet-wise about the axis of said shaft 20. This causes the endless chain 27 to creep around both sprockets. As the sun sprocket 25 is held against rotation about its axis, by the pin 26, the planet sprocket 24 not only moves planet-wise about the shaft 20 but also rotates on its own axis as required by the creeping of the chain 27 around the stationary sun sprocket 25. This produces a rotation of the shaft 23 about its own axis at a reduced speed with relation to the speed of the shaft 20. This reduced speed of rotation of the shaft 23 and planet sprocket about their common axis is transmitted to the driven shaft 28 by the oblique shaft 29 and universal joints 30 and 31. This reduction in speed is equal to the difference in the number of teeth in the sprockets 24 and 25, divided by the number of teeth in the planet sprocket; and the motion of the shaft 28 is in the same direction as that of the shaft 20 if the planet sprocket 24 is larger than the sun sprocket 25, but is in the reverse direction if the planet sprocket is smaller than the sun sprocket.

The arrangement shown in Figs. 1 to 4 inclusive embody the simpler forms of my invention, where variation in the speed reduction obtainable is comparatively limited. By using a plurality of sets of overlapping sprockets in a single speed-reducing mechanism, as shown in Figs. 5, 6, and 7, I can get a very much wider variation in the speed reduction obtainable, by various combinations of numbers of teeth in the different sprockets. This speed reduction may even be as high as the $n$th power of the number of teeth of one of the sprockets, where $n$ equals the number of sets of sprockets used.

Referring first to the arrangement shown in Fig. 5, which is a somewhat diagrammatic figure.

The shaft 20, the frame 21, the crank-arm 22 carrying the eccentric counter-shaft 23, the planet sprocket 24 overlapping the parallel sun sprocket 25 which is fixed to the frame 21 as by pins 26, and the endless chain 27 interconnecting the overlapping sprockets 24 and 25, are substantially the same as in the arrangement shown in Fig. 4. The planet sprocket 24, however, is rigid with a planet sprocket 34 of a second set of overlapping sprockets, and such planet sprocket 34 overlaps an associated parallel sun sprocket 35 fixed on a shaft 36 coaxial with the shaft 20. The overlapping sprockets 34 and 35 are connected by an endless chain 37; which, like the other chains herein described, is of sufficient width to cooperate with both the associated sprockets. If desired for balance in operation, a counter-weight 38 may be provided for balancing the crank-arm 22 and the parts carried thereby.

In the operation of the device shown in Fig. 5, rotation of the shaft 20 causes the two planet sprockets 24 and 34 to move planet-wise about the common axis of the shafts 20 and 36. This causes the endless chain 27 to creep round the sprockets 24 and 25 as already explained in connection with Fig. 4; which creeping, because the sun sprocket 25 is held against rotation, results in a rotation of the planet gears 24 and 34 about their own common axis at a reduced speed with relation to the speed of the shaft 20. The rotation of the planet sprocket 34 about the axis of the shaft 36 results in a creeping of the chain 37 around the two sprockets 34 and 35 associated with it; and this creeping, because of the rotation of the planet sprocket 34 on its own axis in addition to its planetary movement, may result in a turning of the sun sprocket 35 and shaft 36 about their common axis. This rotation of the shaft 36 and sun sprocket 35 will occur save in the single condition where tooth-ratio of the sprockets 34 and 35 equals that of the sprockets 24 and 25. If the planet sprocket 34 is of the same size as the sun sprocket 35, the speed of rotation of the shaft 36 and sun sprocket 35 will be the same as that of the planet sprockets 24 and 34 about their own axis; in which case the two sprockets 34 and 35 and their associated chain 37 constitute merely a device for transmitting the movement of the planet sprocket 34 about its own axis to the shaft 36, and correspond to the oblique shaft 29 and universal joints 30 and 31 of the arrangement shown in Fig. 4. However, if the two sprockets 34 and 35 are of different size, the shaft 36 will rotate at a different speed from the speed of rotation of the planet sprockets 24 and 34 about their own axis. By different interrelations among the numbers of the teeth of the various sprockets, a wide variation in the total reduction in speed may be obtained and the shaft 36 may be driven either in the same direction as the shaft 20 or in the reverse direction. The maximum speed reduction obtainable is the product of the numbers of teeth of the two sprockets 24 and 35.

The arrangement shown in Figs. 6 and 7 is identical in principle with that shown in Fig. 5; but shows a mechanically balanced arrangement by the use of diametrically opposite sets of planet gears. The shaft 20, frame 21, crank-arm 22, eccentric counter-shaft 23 mounted in such crank-arm, planet sprocket 24, fixed sun sprocket 25, holding pins 26 attaching such sun sprocket 25 to the frame 21, endless chain 27, planet sprocket 34 fixed to the planet sprocket 24, sun sprocket 35 mounted on the shaft 36, and endless chain 37, correspond in general to the same parts shown in Fig. 5; but in addition there is a second crank-arm 22$^a$ diametrically opposite the crank-arm 22 and carrying a counter-shaft 23$^a$ diametrically opposite the counter-shaft 23 and having fixed thereon two planet gears 24$^a$ and 34$^a$ which are of the same size as the planet gears 24 and 34 but diametrically opposite to them. The endless chains 27 and 37 are sufficiently long, as is clear from Fig. 7, so that they mesh with their respective sun gears 25 and 35, and with both planet gears 24 and 24$^a$, and 34 and 34$^a$, respectively associated with said sun gears. In this way, a balanced construction is obtained, without the necessity for any counter-weight such as the counter-weight 38 shown in Fig. 5.

I am aware that overlapping sprockets interconnected by endless chains have been used before for the transmission of rotary motion; but they have always been so arranged that the speed ratio between the two sprockets was limited to the inverse ratio of the number of sprocket teeth. By my invention, it is possible to obtain speed ratios many times as high as that, without increasing the diameters of the sprockets used, and while maintaining the entire apparatus within very small compass and operating it with very small moments.

I am also aware that non-overlapping sprockets interconnected by endless chains have been used in planetary arrangements, but they have not been acceptable because of the great amount of space required, the expense and size of the frame and the moving parts, and the great centrifugal forces which were encountered and had to be provided for. These difficulties are all avoided by my invention, which involves overlapping sprockets in a planetary arrangement.

I claim as my invention:

1. A speed-changing chain-drive, comprising the combination of a sun sprocket and a planet sprocket with portions of their disks overlapping, and an endless chain engaging the teeth of both sprockets.

2. A speed-changing chain-drive, comprising the combination of a sun sprocket and a planet sprocket in separate but substantially parallel planes, the axes of said sprockets being separated by less than the the sum of their radii, and an endless chain engaging both sprockets.

3. In a speed-changing mechanism, the combination of a sun sprocket, a planet sprocket which overlaps the sun sprocket and lies in a parallel but separate plane from the sun sprocket, an endless chain interconnecting the two sprockets, and means for preventing the rotation of one of said sprockets about its own axis.

4. In a speed-changing mechanism, the combination of a sun sprocket, a planet sprocket which overlaps the sun sprocket and lies in a parallel but separate plane from the sun sprocket, and endless chain interconnecting the two sprockets, driving means associated with said planet sprocket for revolving it about the axis of the sun sprocket, said planet sprocket having associated therewith means for constraining it as to its rotary movement about its own axis as it is so revolved.

5. In a speed-changing mechanism, the combination of a sun sprocket, a planet sprocket which overlaps the sun sprocket and lies in a parallel but separate plane from the sun sprocket, an endless chain interconnecting the two sprockets, a driving shaft for driving one of said sprockets about the axis of said shaft, and means for restraining movement of one of said sprockets as the planet sprocket is moved in its planet motion.

6. In a speed-changing mechanism, the combination of a sun sprocket, a planet sprocket which overlaps the sun sprocket and lies in a parallel but separate plane from the sun sprocket, an endless chain interconnecting the two sprockets, a supporting frame, a shaft mounted in said frame coaxial with said sun gear and carrying said planet sprocket eccentrically to produce the planet motion of said planet sprocket, one of said sprockets being associated with the supporting frame so that it is held from rotation about its own axis with relation to said frame, and a shaft coaxial with the first shaft and associated with the unconstrained one of said two sprockets to receive motion therefrom.

7. In a speed-changing mechanism, the combination of a sun sprocket, a planet sprocket which overlaps the sun sprocket and lies in a parallel but separate plane from the sun sprocket, an endless chain interconnecting the two sprockets, a supporting frame, a shaft mounted in said frame coaxial with said sun gear and carrying said planet sprocket eccentrically to produce the planet motion of said planet sprocket, one of said sprockets being associated with the supporting frame so that it is held from rotation about its own axis with relation to said frame, and a shaft associated with the unconstrained one of said two sprockets to receive motion therefrom.

8. In a speed-changing mechanism, the combination of a plurality of sets of sprockets, each set of sprockets including a sun sprocket and a planet sprocket which overlaps the sun sprocket, an endless chain connecting the sprockets of each set, the sun sprockets of the different sets being coaxial, and planet sprockets of the different sets being interconnected for corresponding rotary motion about their own axes, two shafts which are substantially coaxial with the sun sprocket, one of said shafts being connected with a planet sprocket for revolving the latter about the axis of the sun sprocket, and the other shaft being connected with one of the sun sprockets of the other set, and means for holding the other sun sprocket from rotation.

9. A speed-changing mechanism, comprising a sun sprocket, a planet sprocket overlapping said sun sprocket, an endless chain interconnecting said two sprockets, means for revolving the planet sprocket about the axis of the sun sprocket, means for constraining one of said sprockets from movement about its own axis, a shaft, and a driving connection between said shaft and the unconstrained sprocket.

In witness whereof, I have hereunto set my hand at Indianapolis, Indiana, this 8th day of December, A. D. one thousand nine hundred and twenty-four.

GEORGE M. BARTLETT.